United States Patent [19]

Gordin et al.

[11] Patent Number: 4,712,167
[45] Date of Patent: Dec. 8, 1987

[54] REMOTE CONTROL, MOVEABLE LIGHTING SYSTEM

[75] Inventors: Myron K. Gordin; James L. Drost, both of Oskaloosa, Iowa

[73] Assignee: Mycro Group Co., Oskaloosa, Iowa

[21] Appl. No.: 880,187

[22] Filed: Jun. 30, 1986

[51] Int. Cl.[4] .................................................. F21P 5/02
[52] U.S. Cl. ...................................... 362/233; 362/61; 362/66; 362/67; 362/85
[58] Field of Search ...................... 362/233, 61, 66, 67, 362/85

[56] References Cited

U.S. PATENT DOCUMENTS

| Re. 30,000 | 5/1979 | Loffler et al. | 362/233 |
| 4,190,881 | 2/1980 | Drost et al. | 362/250 |
| 4,220,981 | 9/1980 | Koether | 362/61 |
| 4,392,187 | 7/1983 | Bornhorst | 362/233 |
| 4,423,469 | 12/1983 | Zerlaut et al. | 362/285 X |
| 4,423,471 | 12/1983 | Gordin et al. | 362/96 |
| 4,450,507 | 5/1984 | Gordin | 362/61 |
| 4,598,345 | 7/1986 | Kleeman | 362/233 |

Primary Examiner—Larry Jones
Attorney, Agent, or Firm—Zarley, McKee, Thomte, Voorhees & Sease

[57] ABSTRACT

A mobile, variable effect lighting device including a mobile base platform to which is mounted an adjustably positionable and extendable boom. A lighting array frame having one or more luminaire assembly units is hingeably mounted to the outer end of the boom. Each luminaire assembly unit, in turn, is individually vertically and horizontally adjustable. Appropriate motor or power mechanisms are operably connected to the luminaire assembly units, the lighting array frame, and the boom to allow automatic and remote adjustability and operation of these components. A control circuitry is operatively connected to the luminaire assembly units and the motor or power mechanisms and has a control unit by which a remote operator can control operation of luminaire assembly units, and their orientation with respect to a target area.

16 Claims, 9 Drawing Figures

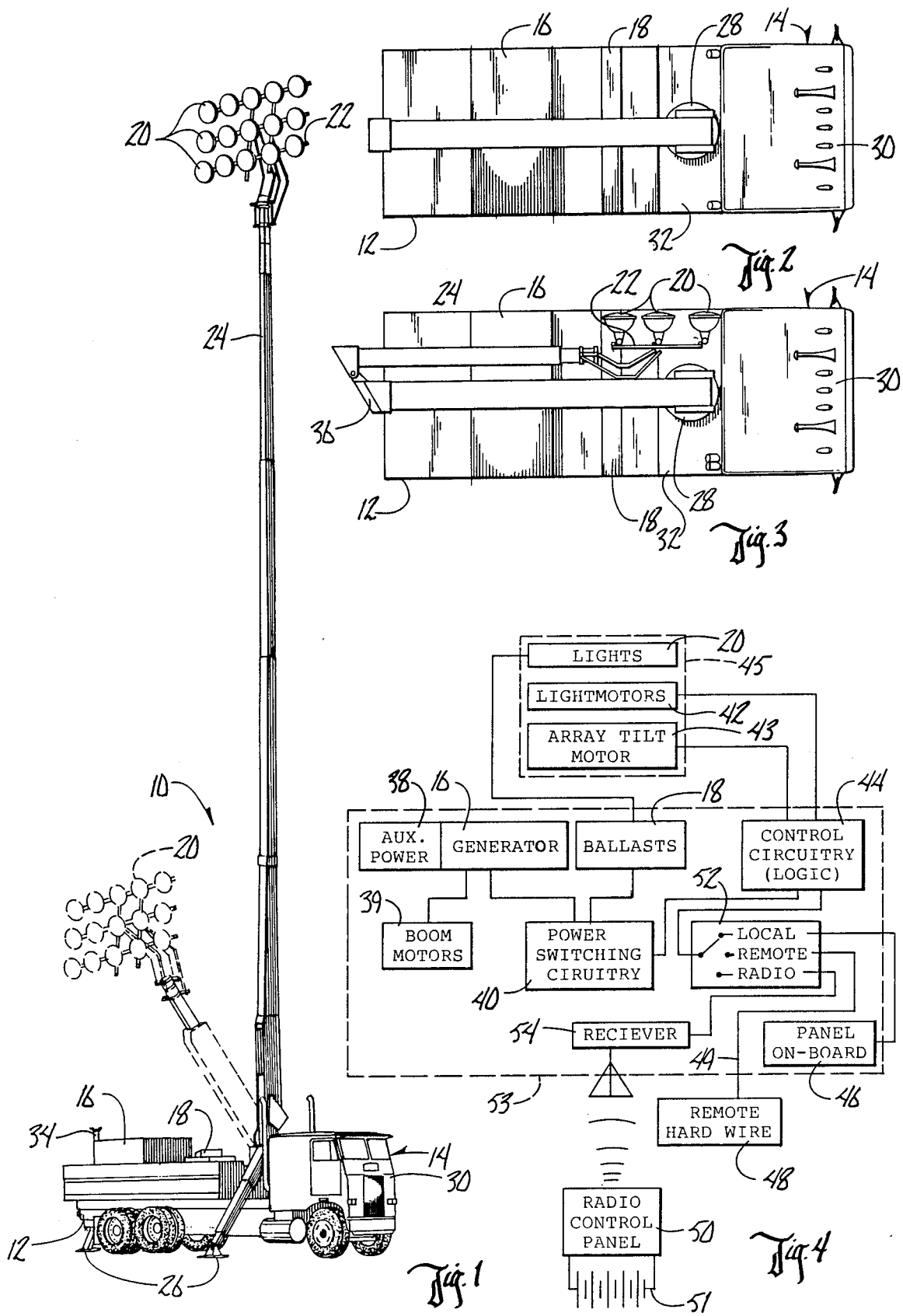

REMOTE CONTROL, MOVEABLE LIGHTING SYSTEM

BACKGROUND OF THE INVENTION

1. Field of the Invention

The present invention relates to a moveable, adjustable, variable effect lighting device and method, and in particular, to an easily transportable, variable effect lighting device and method where the lighting effect can be instantaneously altered and controlled by an operator at a remote location.

2. Problems in the Art

There are many instances where large scale lighting is needed or desired. For example, movies or other film or video productions require large area lighting, either direct or background. Sporting events, construction sites, and promotional events are other applications. At times, emergencies such as fires, rescue operations, or crowd control require wide-scale lighting. Special applications, for example, lighting the space shuttle, also require large area, high intensity lighting.

While devices and methods for wide-scale lighting uses do exist, problems with these devices and methods also exist. A particular problem in many of the applications is the lack of mobility and adjustability in conventional wide-scale lighting systems. Most conventional systems require permanent or semi-permanent construction and set-up which first requires construction of supporting poles or structures. Also, many of these systems require numerous luminaire assembly units to meet the required needs for field and intensity of light.

Significant time and expense is needed to construct and set up these systems. Conversely, the costs involved in dismantling and movement of these devices to different locations becomes almost prohibitive.

Because of the large number of luminaire assembly units, or the supporting structure required to secure the luminaire units in position, many of the conventional systems are not easily adjustable once in position. They usually must be pre-adjusted before being secured to their supporting structure, or they require manual aiming and adjustment by workers who must climb up and manually complete such adjustments.

As can be seen, there is a real need for a wide-scale lighting system which is both adjustable in the type of lighting and lighting effect it can produce, and which is easily and adjustably constructed and set up. Additionally, there is a further need for such a device which is easily and economically mobile.

Currently, certain types of mobile, adjustable lighting systems simply suspend a luminaire assembly unit array upon a framework from a crane. As is obvious, adjustment of the individual lighting units must be done manually by lowering the array, and conventional cranes are not easily and conveniently mobile.

The owner of the present application has developed a mobile, wide-scale lighting system which utilizes an extendable and swivelable boom secured to a truck tractor making the system easily and economically mobile. (See U.S. Pat. No. 4,423,471). This lighting array is adjustably extendable and can be oriented generally in the direction of the target area. However, for certain uses problems still exist in that for each lighting application, the individual lighting units must be singly aimed according to a predetermined analysis to produce the desired lighting effect to the target area. The need still exists for a unit which allows the operator to aim and adjust each lighting unit instantaneously from a control, remote from the lighting units themselves, to vary the lighting effect and the position of the target area.

Another problem exists. In many of the applications where such a system would be desirable, it is required that power for the lamps and the motors controlling the adjustments be immediately available, even in locations where electric power is unavailable. Furthermore, it is generally desirable, particularly in applications such as movie sets, that the power generation be done as quietly as possible.

It is furthermore many times desirable that the operator be able to adjust the lighting effect by personally controlling the lighting effect from the target area.

It is therefore a primary object of the present invention to improve over or solve the problems and deficiencies in the art earlier discussed.

A further object of the present invention is to provide a mobile, variable effect lighting device which can produce variable lighting effects and levels to a target area.

A further object of the present invention is to provide a mobile, variable effect lighting device which can remotely and automatically be adjusted to change the lighting effect and the target area.

Another object of the present invention is to provide a mobile, variable effect lighting device which can be easily moved from location to location and which can be easily and quickly set up or prepared for transport.

Another object of the present invention is to provide a mobile, variable effect lighting device which utilizes selfcontained and quiet power generation.

A further object of the invention is to provide a mobile, variable effect lighting device which allows multiple and individual adjustment of lighting fixtures according to desire.

Another object of the present invention is to provide a mobile, variable effect lighting device which is flexible in its application, is easily adjusted, is durable, and economical.

These and other objects, features, and advantages of the present invention will become more apparent with reference to the accompanying specification and claims.

SUMMARY OF THE INVENTION

The present invention is a means and method for providing mobile, variable-effect lighting. The method of the invention includes the following steps. One or more lighting or luminaire assembly units, connected to a frame at the end of an extendable and adjustable boom on a moveable base, are moved to a position capable of producing the approximated lighting effect to the target area. The luminaire assembly units, the frame upon which they are mounted, and the boom are adjusted to an approximate position for producing the desired lighting effect to the target area. A controller then actuates the desired luminaire assembly unit or units to produce light on the target area. The actual lighting effect is then compared with that desired and the luminaire assembly units, frame, and boom are adjusted to achieve the desired lighting characteristics to the target area.

If the produced lighting effect is not as desired, or the controller wants to change the lighting effect on the target area, the system may be immediately and remotely adjusted to accomplish the same. Each lighting assembly unit can be individually controlled to turn on or off, to pan or tilt, and to produce a light beam anywhere between a narrow spot beam and a wide flood beam. Likewise, the lighting array frame and the boom are adjustable by the user by automatic control.

The control for producing the variable lighting effects can be positioned on a control panel on the mobile base. Alternatively, remote control, either hard-wired or by radio signals or other means without wires, can also be utilized. A power generator for producing the light beams and adjusting the boom, frame, and luminaire units is carried on-board, and is quiet so that the power generation does not unduly or detrimentally disturb the area surrounding the mobile base and the target area. The generator is particularly valuable for movie set lighting.

The means of the invention utilizes the above discussed elements to present apparatus which produces variable effect, adjustable lighting to a target area, all controlled remotely from the lighting units themselves.

BRIEF DESCRIPTION OF THE DRAWINGS

FIG. 1 is a perspective view of the apparatus of the invention with the boom in an extended vertical position, and showing in ghost lines, the boom retracted and at an angular position.

FIG. 2 is a top plan view of the mobile base with the boom in position for transport and the lighting array frame and lighting units removed.

FIG. 3 is a top plan view of the mobile base showing an alternative embodiment of FIG. 2 having the boom retracted and in a transport mode but with the lighting array frame and luminaire assembly units connected thereto.

FIG. 4 is a schematic of the electronic control circuitry for the present invention.

DETAILED DESCRIPTION OF THE PREFERRED EMBODIMENT

Figure 5:
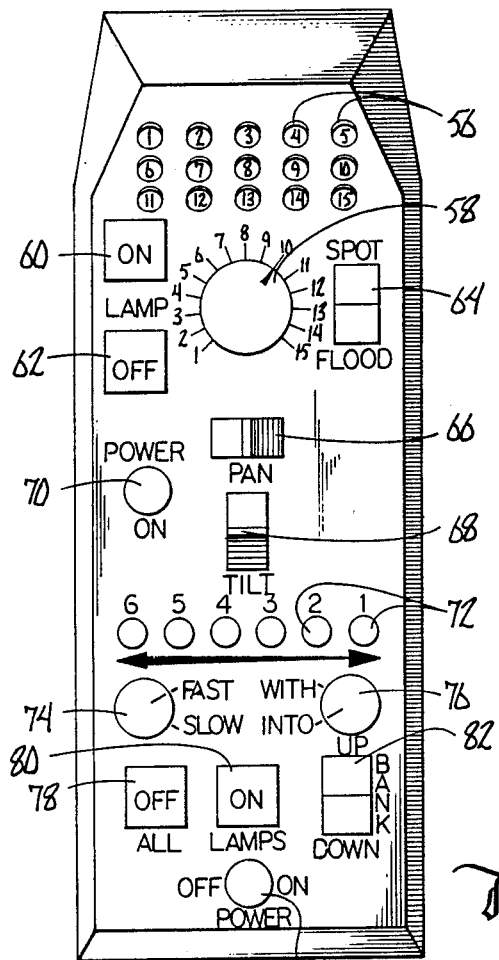
FIG. 5 is a top plan view of one embodiment of a control panel for the present invention.

In reference to the drawings, and particularly FIG. 1, there is shown a mobile variable effect lighting device 10 according to the present invention. The lighting device is mobile by virtue of the truck bed or base 12 provided by tractor truck 14, as is conventional. Operating power for the system is provided by on-board generator 16 which can be a diesel gasoline generator such as is known in the art. Such items as ballasts 18, and control circuitry are also mounted upon base 12 of tractor truck 14. An array of luminaire assembly units 20 are mounted to a lighting array frame 22 which is in turn mounted to extendable and articulated boom 24. As is conventional in the art, boom 24 can be extended between the lengths shown in FIG. 1 and at the same time can be swivelled and angularly tilted in any state of extension. The ghost lines in FIG. 1 show boom 24 in a retracted state, and angularly tilted from vertical. It is to be noted that the preferred embodiment includes braces 26 which extend from tractor truck 14 to the ground to stabilize and secure the device 10 when boom 24 is extended or angularly adjusted.

The adjustability of boom 24 allows device 10 to provide light over (and around) tall objects, and for long distances. Also, while leaving tractor truck 14 in a single location, lighting frame 22 can be brought closer or farther away to a target area, all without having to move tractor truck 14 itself.

FIG. 2 is shown to illustrate the lay-out of base platform 12 of tractor truck 14. Generator 16 is positioned over the rear axles of tractor truck 14 for support and weight balance. Ballasts 18 are consolidated and likewise balanced across base platform 12 forward of generator 16. Finally, the swivelable mount 28 for boom 24 is centered and secured just behind cab 30 of tractor truck 14. The control circuitry and on-board control panel for the device 10 is contained in control box 32. FIG. 2 also shows boom 24 as collapsed and lowered to a horizontal position ready for transport. The boom end mount 34 (See FIG. 1) has been detached along with lighting frame 22 with the luminaire assembly units 20. These elements then can be either mounted on base 12 for transport or carried in a trailer or by other means.

FIG. 3 shows an alternative embodiment of device 10 wherein a foldable joint 36 is included on boom 24 so that boom end mount 34, lighting frame 22, and luminaire assembly units 20 can be transported without disassembly or detachment. Some rearrangement of ballast 18, and control box 32 may be necessary to provide space for luminaire assembly units 20 and lighting frame 22, however the same overall structure and positioning of the elements on base 12 is retained.

FIG. 4 provides a schematic representation of the circuitry of device 10. All such circuitry is conventional and is known and can be constructed by those of ordinary skill in the art. The circuitry connects the power source 16 with the components needed to operate the luminaire assembly units 20 of device 10.

The power source or on-board generator 16 provides electrical power to luminaire assembly units or lamps 20 through ballasts 18. It is noted that by placing the heavy and cumbersome ballasts for the lamps down on the base 12 of tractor truck 14, significant weight and surface area is eliminated from the lighting frame array 22. It is also noted that auxiliary power 38 can be tapped from generator 16 to allow other electrical equipment to be powered and operated locally from the device 10. The is particularly helpful when the device 10 is being used in areas which are remote from electrical power sources. Generator 16, also supplies power to boom motors 39 which power the extension, swivelling, and tilting of boom 24.

Power switching circuitry 40 is connected between generator 16 and ballasts 18 and contains the circuitry necessary for providing power to luminaire assembly units 20 and for turning units 20 on and off. Light motors 42 and array tilt motor 43 are powered and controlled through control logic circuitry 44 and are positioned up upon lighting array frame 22. Motors 42 and 43 allow luminaire assembly units 20 to be panned or tilted, and the whole lighting array frame 22 to be tilted, respectively. In FIG. 4, light motors 42 and 43, and lamps or luminaire assembly units 20 are depicted inside dashed lines 45 to illustrate these elements are positioned up upon lighting array frame 22.

Control logic circuitry 44 contains the logic circuitry for device 10. Control logic circuitry 44 receives input trol 50 were to turn so that the operator's back was to luminaire assembly units 20, lamp indicators 56 would not correlate with luminaire assembly units 20 but would be reversed. Therefore, by moving rotary switch 76 to the "with" position, the correlation of lamp indictors 56 would change so that lamp indicator 56 labeled "5" on the control panel of FIG. 5 would correspond to the same luminaire assembly unit 20 in the upper left hand corner of the lighting frame array of FIG. 1. This would allow the operator to control the device 10 while turned away from device 10 or looking directly at the target area. The correlation between lamp indicators 56 and the actual luminaire assembly units 20 is thus "reversed".

"Off" and "on" push buttons 78 and 80 control, with one touch, the simultaneous illumination of all luminaire assembly units 20 on lighting array frame 22. Thus, once each luminaire assembly unit 20 has been adjusted, the whole array can be turned on. Alternatively, the entire array of luminaire assembly units 20 can be initially turned on and then each assembly unit 20 can be panned, tilted, or have its beam width adjusted.

Toggle switch 82 provides the additional feature of controlling the tilting of the lighting array frame 22 so that the entire array of luminaire assembly units 20 can be banked up or down depending upon whether toggle switch 82 is pushed upwardly or downwardly.

Finally, push button switch 84 controls on and off power to the control panel itself, if it is remote battery-powered radio control 50, to allow operation of the above described adjustment switches and features.

Figure 6:
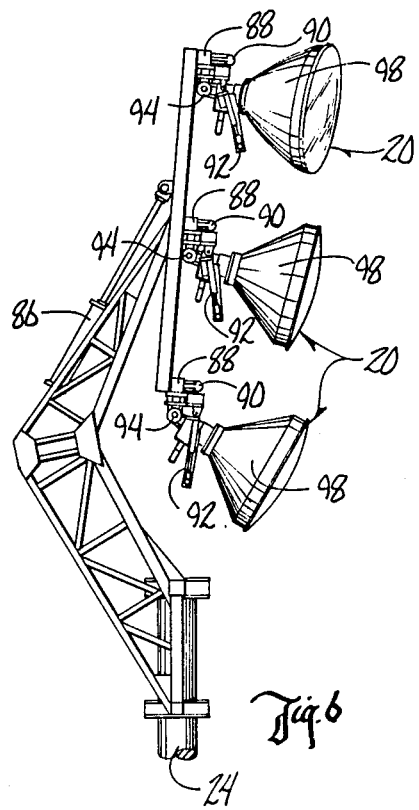
FIG. 6 is a side elevational view of the lighting array frame and luminaire assembly units.

FIG. 6 depicts lighting array frame 22 with luminaire assembly units 20 as it is hingeably attached to boom end mast 34 at the top of boom 24. A mechanism, such as screw drive motor 86, is attached between boom end mast 34 and lighting array frame 22. Operation of screw drive motor 86 can tilt lighting array frame 22 according to desire.

Figure 7:
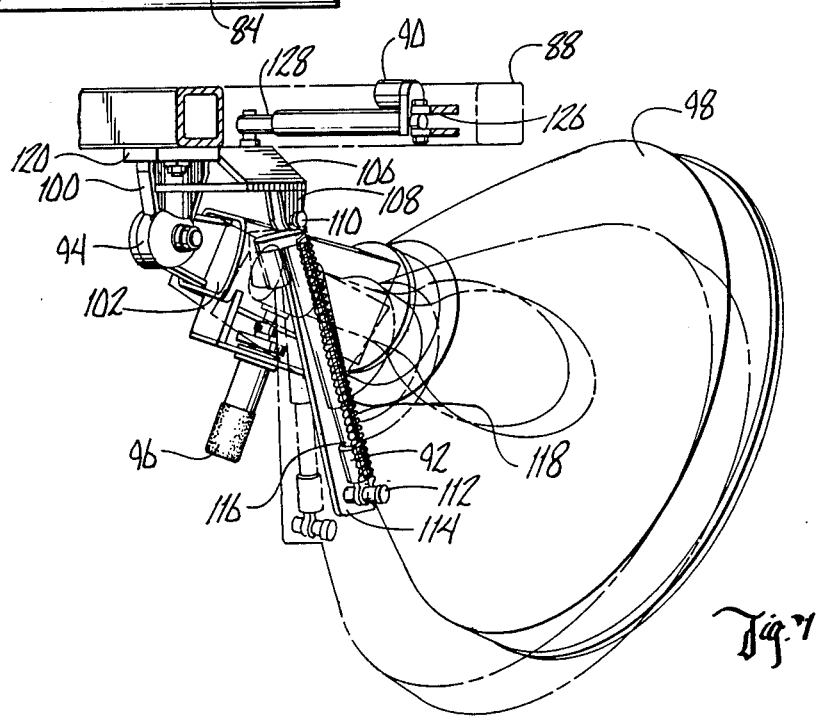
FIG. 7 is a partial perspective view of an individual luminaire assembly unit and the mechanism for adjusting it with respect to the lighting array frame.
Figure 8:
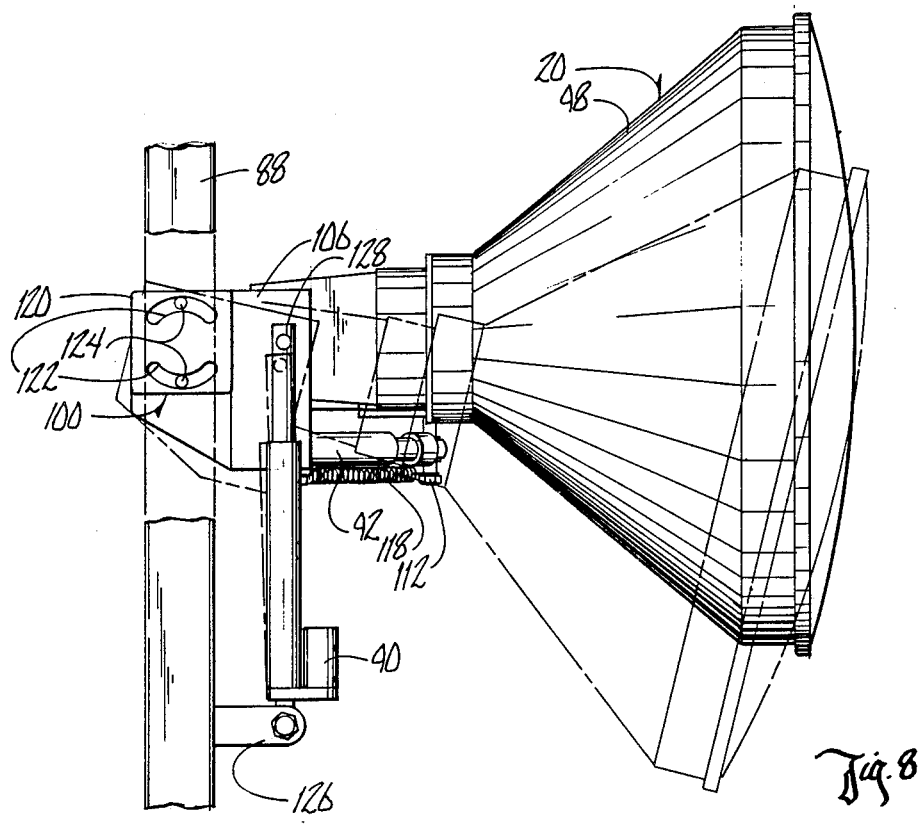
FIG. 8 is a top plan view of an individual luminaire assembly unit and the structure allowing the unit to pan with respect to the lighting array frame.

FIGS. 6, 7, and 8 depict how each individual luminaire assembly unit 20 can be either panned or tilted with respect to lighting array frame 22, and each other. Each luminaire assembly unit 20 is adjustably secured to a respective cross beam 88 of lighting array frame 22. Panning screw drive motors 90 are then hingeably attached between cross beams 88 and luminaire assembly units 20 and allow horizontal panning adjustment of luminaire assembly units 20. Tilting screw drive motors 92 are attached between first and second portions 100 and 102 (See FIG. 7) of luminaire assembly units 20 to control tilting adjustment of luminaire assembly units 20. First and second portions 100 and 102 are seprated by elbow 94 which allows the tilting action. FIG. 6 depicts top luminaire assembly unit 20 moved or panned to the left while bottom luminaire assembly unit 20 has been tilted downwardly, as compared to the middle luminaire assembly unit 20.

The variable beam capacity of luminaire assembly units 20 is facilitated by small DC motors 96 which are secured to luminaire assembly units 20 and move the lamps of units 20 inwardly or outwardly with respect to the reflectors 98 of units 20 to produce the variable beam, as disclosed in the previously mentioned copending application entitled "Variable Beam Lighting Device". In the preferred embodiment DC motors 96 are small, fractional horsepower DC operated gear motors available from TRW, Globe Motors, Dayton, Ohio.

It can therefore be seen from FIG. 6 that individual luminaire assembly units 20 can be adjusted independently from each other and to different orientations with respect to a target area to produce unlimited number of different lighting effects.

FIG. 7 depicts the tilting adjustability of each luminaire assembly unit 20. Luminaire assembly unit 20 includes a beam attachment portion 100 which is connected by hinged elbow 94 to lamp fixture portion 102. A lamp 104 (not shown) is operatively mounted in lamp fixture portion 102. A reflector 98 is then attached to lamp fixture portion 102.

A bracket 106 is rigidly secured to beam attachment portion 100 and extends outwardly therefrom. Bracket 106 includes yoke 108 to which is hingeably attached tilting screw drive motor 92 at one end by a pin 110 extending through yoke 108. The other end of tilting screw drive motor 92 is journaled around pin 112 which is rigidly secured to arm 114 which in turn is rigidly secured to the lamp fixture portion 102 of luminaire assembly unit 20. By operation of tilting screw drive motor 92, extendable portion 116 of screw drive motor 92 can either extend downwardly or retract upwardly according to instruction from the control panel and circuitry. Extending downwardly causes lamp fixture portion 102 to hinge downwardly from beam attachment portion 100 thus tilting luminaire assembly unit 20. Spring 118 is provided to assist in smooth movement and in pulling luminaire assembly unit 20 upwardly. The tilting action, as described, is shown by ghost lines in FIG. 7.

Similarly, FIG. 8 depicts panning adjustability of luminaire assembly units 20. Beam attachment portion 100 of each luminaire assembly unit 20 is actually moveably secured to its respective cross beam 88 by utilizing an attachment plate 120 having opposing curved slots 122. Bolts or pins 124 are secured through slots 122 into cross beam 88. A panning screw drive motor 90 is hingeably secured between bracket 106 of beam attachment portion 100 of luminaire assembly unit 20 and arm 126 which is attached to cross beam 88. Operation of panning screw drive motor 90, causing retraction or extension of extendable portion 128 causes panning adjustment of luminaire assembly unit 20 in either direction. FIG. 8 shows in ghost lines panning adjustment to the left.

Figure 9:
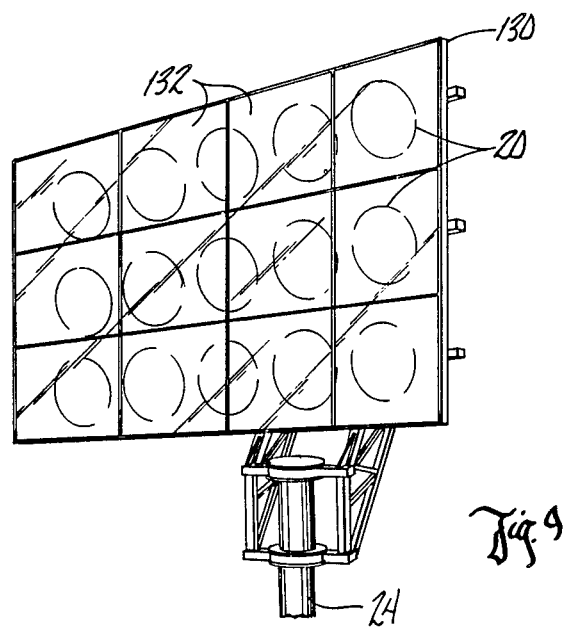
FIG. 9 is a perspective view of the lighting array frame and luminaire assembly units including a rack assembly which allows further variance of the light beams emanating from the luminaire assembly units.

FIG. 9 illustrates an optional attachment to lighting array frame 22. A rack assembly 130 can be secured by means known within the art to lighting array frame 22 to cover one or more of luminaire assembly units 20. Rack assembly 130 includes panels 132 which can produce light varying effects. For example, panels 132 could be of suitable material, as is known in the art, to diffuse the light emanating from luminaire assembly units 20 to provide a diffused light similar to soft daylight or moonlight. Alternatively, panels 132 could have appropriate properties to tint or otherwise modify the light from luminaire assembly units 20. Other modifications are possible, as are known in the art.

A summary of the operation of the present invention begins with the mobility of the device 10. The self-contained power and ease of transport provided by tractor truck 14 and on-board generator 16 allows quick, easy, and economical transport for long distances, or for only a few feet. Secondly, construction and set-up is likewise easy, efficient, and economical. Once the tractor truck 14 is positioned, and braces 26, if needed, are put in place, the operator secures the lighting array frame 22 from either on-board (local) control panel 46, hardwire (remote) control 48 or radio (remote) control 50. A switch 52 is included with control box 44 circuitry to select between controls 46, 48, or 50.

An operator can therefore control the luminaire assembly units 20 either directly on-board truck tractor 14 by on-board control panel 46, or at a distance away from truck tractor 14 by using hardwire control 48, which is connected to control logic circuitry 44 by an electrical cord 49. In the preferred embodiment, hardwire control panel 48 can be linked to control logic circuitry 44 by a cord 49 which can be many hundreds of feet long.

As a third alternative, a radio remote control 50 can be utilized in combination with a radio receiver 54 on-board and directly connected to control logic circuitry 44. As is conventional, depending upon the type of radio control 50 and receiver 54 selected, the operator can operate luminaire assembly units 20 from even greater distances, and not have the clumsiness and cumbersomeness of an electrical cord. Radio remote control includes a battery power supply 51.

It is noted that in FIG. 4, all elements of the circuitry which are positioned on base 12 of tractor truck 14 are enclosed by dashed lines 53, while, as previously explained, dashed lines 45 enclose the elements at the top of boom 24. Hard-wired control 48 and radio control 50 are depicted outside of dashed lines 45 and 53 to illustrate that they can be taken to positions a distance away from or remote to tractor truck 14.

By referring to FIG. 5, one embodiment of a control panel for the device 10 is shown. The features on the panel shown in FIG. 5 could be utilized in on-board control panel 46, hard-wired control 48, or radio remote control 50. FIG. 5 depicts a control panel in a form easily adaptable to be hand held, especially for controls 48 and 50.

The control panel of FIG. 5 includes the following features. Beginning at the top, a plurality of lamp indicators 56 represent and correspond to the actual array of luminaire assembly units 20 of device 10. Lamp indicators 56 can comprise low power lights such as light emitting diodes (LEDs) and are illuminated when the corresponding luminaire assembly unit 20 is turned on. The operator can thus at a glance, view lamp indicators 56 to confirm which luminaire assembly units 20 are turned on, and which are turned off without having to actually look up at luminaire assembly units 20. Lamp indicators 56 are specifically correlated so that the operator only has to visually compare the position of lamp indicators 56 to a corresponding position on the array of luminaire assembly units 20. For example, in a preferred embodiment shown in the drawings, FIG. 1 shows that there are fifteen luminaire assembly units 20. Correspondingly, there are fifteen lamp indicators 56 arranged in three rows and five columns. Additionally, each lamp indicator 56 is numbered from "1" to "15" to provide for easier referencing.

A rotary click stop switch 58 has 15 positions which correspond to the 15 luminaire assembly units 20. By turning click stop switch 58 to the corresponding numbered position, that particular luminaire assembly unit 20 can be turned on or off, can be adjusted position-wise, and the width of the light beam it produces can be varied. The adjustments possible for each individual luminaire assembly unit 20 are as follows.

"On" and "off" push button switches 60 and 62 turn the corresponding luminaire assembly unit 20 on or off.

Toggle switch 64 allows the operator to adjust the beam width of the corresponding luminaire assembly unit 20 between a spot beam and a flood beam. By depressing the upper portion of toggle switch 64, a mechanism (including a light motor 42) is activated to adjust the beam produced by the unit 20 towards a narrow spot beam. Depressing the lower half of toggle switch 64 produces the opposite effect of varying the beam towards a wide flood beam. By releasing toggle switch 64, the beam will be set at that current width. The mechanism to accomplish variable beam width is disclosed and explained in the co-owned and co-pending application entitled "Variable Beam Lighting Device" and filed Mar. 10, 1986 by the same inventors of the present application. The subject matter of that application is incorporated in the present application by reference.

Toggle switch 66 allows the operator to cause panning movement of the corresponding luminaire assembly unit 20. As can be seen, toggle switch 66 is disposed horizontally so that the operator can correspondingly, by moving toggle switch 66 either left or right, cause horizontal panning of luminaire assembly unit 20 left or right respectively.

Similarly, toggle switch 68 controls the tilting action of the corresponding luminaire assembly unit 20. As it is disposed vertically, moving toggle switch 68 up or down causes corresponding tilting movement of luminaire assembly unit 20 up or down respectively.

On/off indicator 70 can be a light such as an LED, which becomes illuminated when power is supplied to the system, or in the case of radio remote control 50, when the battery powered remote control 50 is turned on.

Push button switches 72 correspond to six pre-set beam widths between flood and spot beams. By depressing any one of switches 72, the corresponding luminaire assembly unit 20 dialed up on click-stop switch 58 will automatically move to the pre-set beam width. This allows for quick and efficient set up of beam widths for luminaire assembly units 20 and eliminates the need to use toggle switch 64 to slowly adjust the beam width of each luminaire assembly unit 20.

Rotary switch 74 can be turned between fast or slow positions. Setting of switch 74 controls the speed at which the other operations take place. For instance, it may be desired to have one luminaire assembly unit 20 pan very slowly for a particular lighting effect or for lighting set up. Switch 74 would thus be set towards the slow position. Alternatively, if quick set-up or adjustment is needed, switch 74 would be set towards the fast position. Switch 74 also controls the speed of adjustment for tilting and changing the beam widths of luminaire assembly units 20 and for tilting the whole lighting array frame 22.

Rotary switch 76 can be moved between what has been labeled the "with" position and the "into" position in FIG. 5. Rotary switch 76 is called the "pan reverser" switch. By facing luminaire assembly units 20 with the control panel of FIG. 5, and having rotary switch 76 turned to the "into" position, lamp indicators 56 would correspond in position to the position of luminaire assembly units 20 on the lighting array frame. Thus, lamp indicator 56 in FIG. 5 which is labeled "1", being in the upper left hand corner of the array lamp indicators 56, would correspond to the upper left hand luminaire assembly unit 20 of FIG. 1. However, if the operator, using either hardwired control 48 or radio remote conwith luminaire assembly units 20 to the boom end mount 34 of boom 24, if not already in place, and then operates the appropriate equipment, as is conventional and known in the art, to orientate or extend boom 24 as desired. Once boom 24 is in place, the operator utilizes any of the control panels 46, 48, or 50 to tilt the lighting array frame 22, turn on any number of luminaire assembly units 20, and adjust their horizontal or vertical orientation with regard to the target area. Furthermore, adjustments can be made in the beam width of each individual luminaire assembly unit 20.

The variety and flexibility of device 10 allows the operator to use only one luminaire assembly unit 20, or the entire array of fifteen. It also allows instantaneous and on the spot adjustment of any of the lights. If a change in lighting effect is needed, the operator simply adjusts the device 10 to meet the required needs.

As a specific example, a lighting director for a movie set may want to experiment with the lighting for a particular scene. Once the boom 24 has been positioned, the easily understandable controls allow the user to experiment with the lighting to achieve the desired effect. This can be done either facing or with back turned to the luminaire assembly units 20. Furthermore, the remote control capabilities allow the lighting director to, in fact, stand in or near the target area. The lighting director can then him/herself instantaneously adjust the lighting characteristics of device 10 eliminating the need to direct others to alter manually adjustable lighting fixtures.

Movement of device 10 to the next lighting location is quick and easy, saving time and resources. The possibilities and flexibility of device 10 are limitless.

For clear understanding, it is preferred that some of the elements of the present invention have the following specifications. It is preferred that on-board generator 16 be constructed so that it produces a sound level of no more than 50 dB at 50 feet. It is diesel powered, and thereby can utilize the same fuel from the fuel tanks of tractor truck 14, and should produce anywhere from 120 to 480 volts AC, and 12 volts DC. Generator 16, having the capability of producing a wide range of voltages, can also provide auxiliary power on location at conventional power levels (i.e. 120, 208, 240, 277, 480 volts AC, including 12 volt DC). The low sound level produced by generator 16 is accomplished by a number of different methods. A larger diameter cooling fan is used so that it can run at a slower, and quieter speed. Baffling is added so that sound can not travel directly outward from generator 16, but must travel a tortuous and longer path. The housing of generator 16 totally encloses generator 16 and may also be lined with lead and/or foam rubber to trap sound or disallow it from getting out. Larger exhaust mufflers are used, and they are directed in a direction (such as straight up) which will have the least noise effect. Resilient cushioning (such as rubber) is positioned between generator 16 and truck bed 12 to reduce vibration. Other structure and methods can be additionally utilized, as are known in the art.

Hardwire control 48 can have a 500 to 1000 foot cord line 49. The limits for radio remote control 50 are dictated only by the range of transmitting and receiving power. The ballasts for luminaire assembly units 20 are 480/277 volt, four-wire ballasts.

The screw drive motors 90 and 92 are mechanical drives consisting of a screw member within a housing, the housing containing a gear drive to move the screw longitudinally through the box. Motors 90 and 92 are small, low-power motors which, as is conventional and known in the art, stall when encountering certain levels of resistance. Therefore, motors 90 and 92 will not break any structure if they snag, bind, or otherwise cannot move the desired distance or angle. In the preferred embodiment screw drive motors 90 and 92 are DC operated linear actuators available from Warner Electric Brake and Clutch, Beloit, Wis.

It is to be understood that the present invention can take many forms and embodiments. The true essence and spirit of this invention are defined in the appended claims, and it is not intended that the embodiment of the invention presented herein should limit the scope thereof.

What is claimed is:

1. A self-powered, mobile, controllable, and variable effect lighting device for high power, high intensity large scale lighting applications comprising:

a mobile base platform which is moveably positionable along the ground;

a boom mounted upon said base platform and having an outer end which is adjustably swiveleable, tiltable, collapsible and extendable with respect to said base platform;

a lighting array frame adjustably mounted to said outer end of said boom, said lighting array frame being independently tiltable in addition to being orientational according to the adjustable positioning of said boom;

at least one luminaire assembly unit, each producing a lightbeam and being adjustably mounted to said lighting array frame, each said luminaire assembly unit being independently pannable and tiltable in addition to being orientational according to the adjustable positioning of said boom;

luminaire mounting means connected between each said luminaire assembly unit and said lighting array frame for adjustably mounting each said luminaire assembly unit to said lighting array frame to allow independent panning and tilting of each luminaire assembly unit;

actuator means operatively associated with said luminaire mounting means and said lighting array frame for causing adjustable panning and tilting of each said luminaire assembly unit with respect to said lighting array frame;

first motor means operatively associated with the said lighting array frame for causing the adjustable movement of said lighting array frame with respect to said boom;

second motor means operatively associated with each said luminaire assembly unit for allowing selective adjustment of the width of said corresponding light beam;

power means operatively associated with said boom for causing adjustable movement of said boom with respect to said base platform;

generator means on said mobile base platform for producing different electrical power levels, including sufficient electrical power to operate the high power, high intensity large scale lighting of each said luminaire assembly unit, and for producing sufficient electrical lower-levels of power for other elements of the lighting device, and for auxiliary devices;

control circuitry mounted to said base platform for supplying operating power from said generator means to each said luminaire assembly unit, actuator means, first and second motor means, and power means;

ballast means secured to said mobile base platform to provide ballast between said generator means and each of said luminaire assembly unit;

switching means operatively connected between said generator means and said ballast means to provide switching for the high electrical power for each said high intensity, large scale lighting luminaire assembly unit, said switching means being controlled by signals from said control circuitry; and control means associated with and in operative communication with said control circuitry for allowing control of the beam of orientation of each luminaire assembly unit and of the vertical and horizontal positioning of said lighting array frame, said control means including first and second manual control panels, said first control panel being positioned on said mobile base platform and operatively connected by electrical conduits to said control circuitry, said second control panel being operatively connected to said control circuitry and being manually moveable to a location away from said mobile base platform.

2. The device of claim 1 wherein said mobile base platform comprises a self-locomoting truck.

3. The device of claim 1 wherein said boom is collapsible to a size which can be carried on said mobile base platform.

4. The device of claim 1 including a plurality of luminaire assembly units.

5. The device of claim 1 wherein said luminaire mounting means is hingeably adjustable to allow adjustment of each luminaire assembly unit.

6. The device of claim 1 wherein said actuator means comprises a first linear panning actuator for adjusting said luminaire assembly unit horizontally, and a second linear tilting actuator for adjusting said luminaire assembly unit vertically.

7. The device of claim 1 wherein said luminaire assembly units further comprise a luminaire fixture, a lamp and a reflector, said lamp being adjustably mounted to said luminaire fixture and being movable with respect to said reflector in response to said second motor means so that the width of the beam of said luminaire assembly unit can be narrowed or widened.

8. The device of claim 1 wherein said mobile base platform further comprises all ballast means for said luminaire assembly units, all power sources, and all switching controls so that said device is mobile, self-contained, and self-powered.

9. The device of claim 1 wherein said mobile base platform further comprises auxiliary power supplies for producing auxiliary power.

10. The device of claim 1 wherein said control means is operatively connected to said control circuitry on said mobile base platform.

11. The device of claim 1 wherein said second control panel is operatively connected by extendable wires to said control circuitry mounted on said mobile base platform, said second control panel being moveable to a remote location according to the length of said wires.

12. The device of claim 1 wherein said control means further includes a third control panel comprising a portable radio signal transmitter which communicates control signals with a radio signal receiver positioned and operatively connected to said control circuitry on said base platform.

13. The device of claim 1 further comprising a beam altering rack which can be operatively mounted to said lighting array frame in front of any said luminaire assembly unit, said light altering rack having properties for altering the light beam emanating from said luminaire assembly unit.

14. The device of claim 13 wherein said light altering rack diffuses said beam.

15. The device of claim 13 wherein said light altering rack alters the color of said beam.

16. A method of providing self-powered, moveable, controllable, variable lighting, high power, high intensity large scale lighting applications for target areas such as for movie sets and the like comprising:

moving a moveable base including an adjustably positionable swivelable, tiltable, collapsible and extendable boom with and adjustably positionable lighting array frame having a plurality of adjustably positionable luminaire assembly units mounted thereon to a desired position relative to said target area said luminaire assembly units being independently pannable and tiltable in addition to being orientational according to adjustable positioning of the lighting array frame and the boom;

adjusting said boom to a desired position relative to said target area;

orienting said lighting array frame to a desired position relative to said target area by remote control at a position remote from said lighting array frame;

orienting at least one of said luminaire assembly units as desired with respect to said target area by remote control at a position remote from said luminaire assembly unit;

generating electrical power from a generator means positioned on said moveable base to deliver sufficiently high power to operate each said luminaire assembly unit and to deliver sufficient power to various other power levels for use by electrical activators and motors to adjustably position said boom, lighting array frame, and each luminaire assembly unit to desired orientations;

producing a light beam for each utilized luminaire assembly unit according to desire with respect to said target area by remote control at a position remote from said luminaire assembly unit; and adjusting the beam characteristics or orientation of any said luminaire assembly unit, the position of said lighting array frame or boom, or the position of said moveable base with respect to said target area to achieve the desired lighting characteristics at said target area by remote control at a position remote from any said luminaire assembly unit, said lighting array frame, and said boom.

* * * * *